No. 645,470. Patented Mar. 13, 1900.
H. H. GORTER.
PORTABLE WATER TOWER.
(Application filed Jan. 11, 1899.)

(No Model.) 6 Sheets—Sheet 1.

Witnesses:
K. Lockwood Nevins.
Chas. Healey

Inventor.
H. H. Gorter,
By Francis M. Wright
Atty

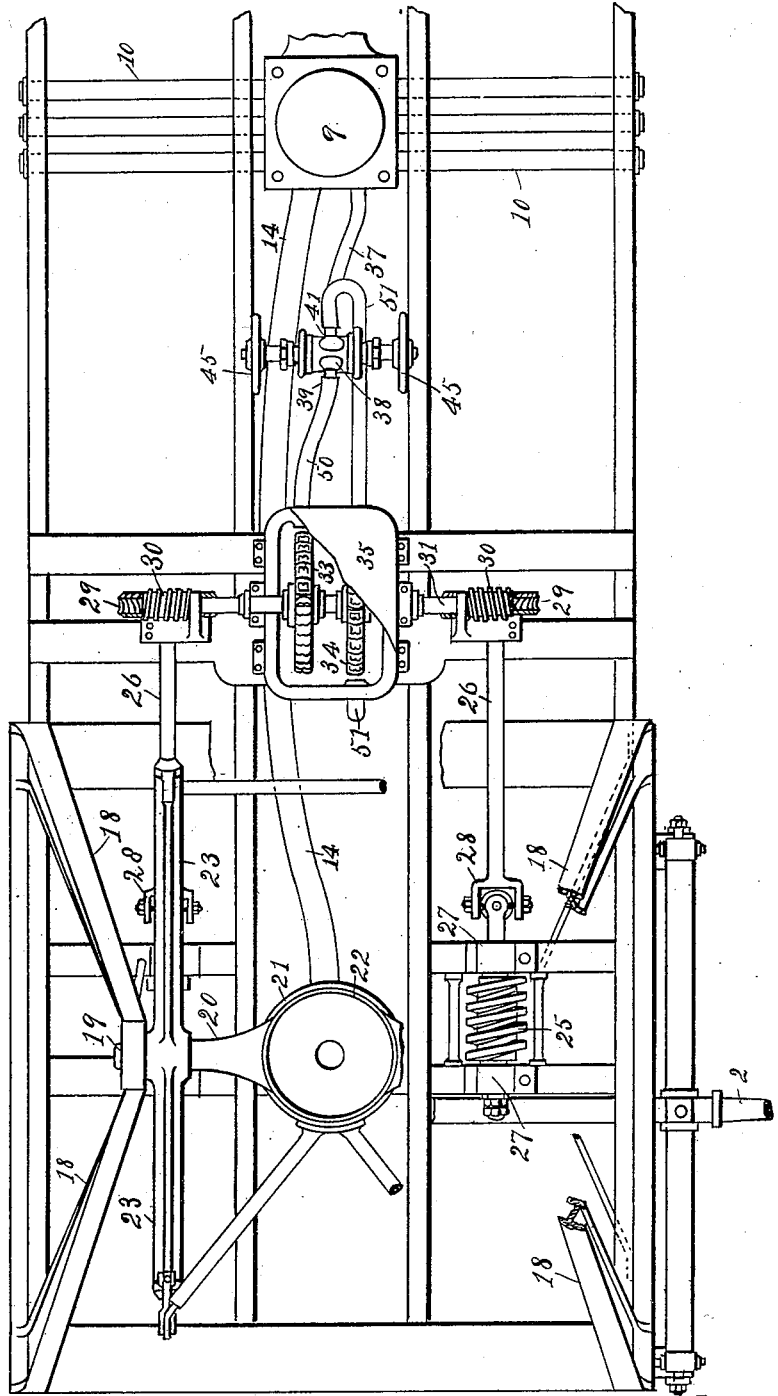

No. 645,470. Patented Mar. 13, 1900.
H. H. GORTER.
PORTABLE WATER TOWER.
(Application filed Jan. 11, 1899.)
(No Model.) 6 Sheets—Sheet 3.
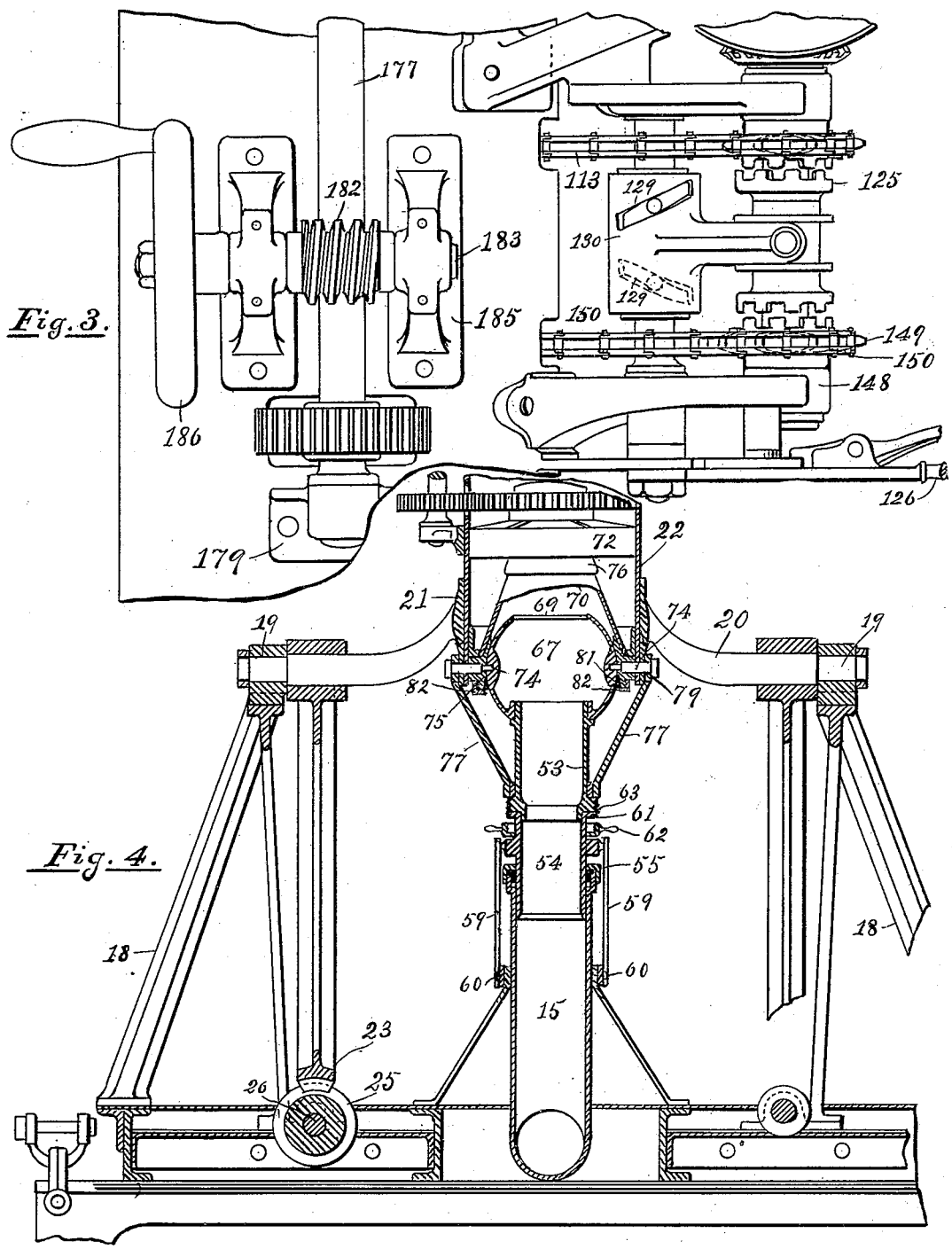
Witnesses:
K. Lockwood Nevins.
Chas. Healey.
Inventor.
H. H. Gorter,
By Francis W. Wright
Atty.

No. 645,470. Patented Mar. 13, 1900.
H. H. GORTER.
PORTABLE WATER TOWER.
(Application filed Jan. 11, 1899.)
(No Model.) 6 Sheets—Sheet 4.
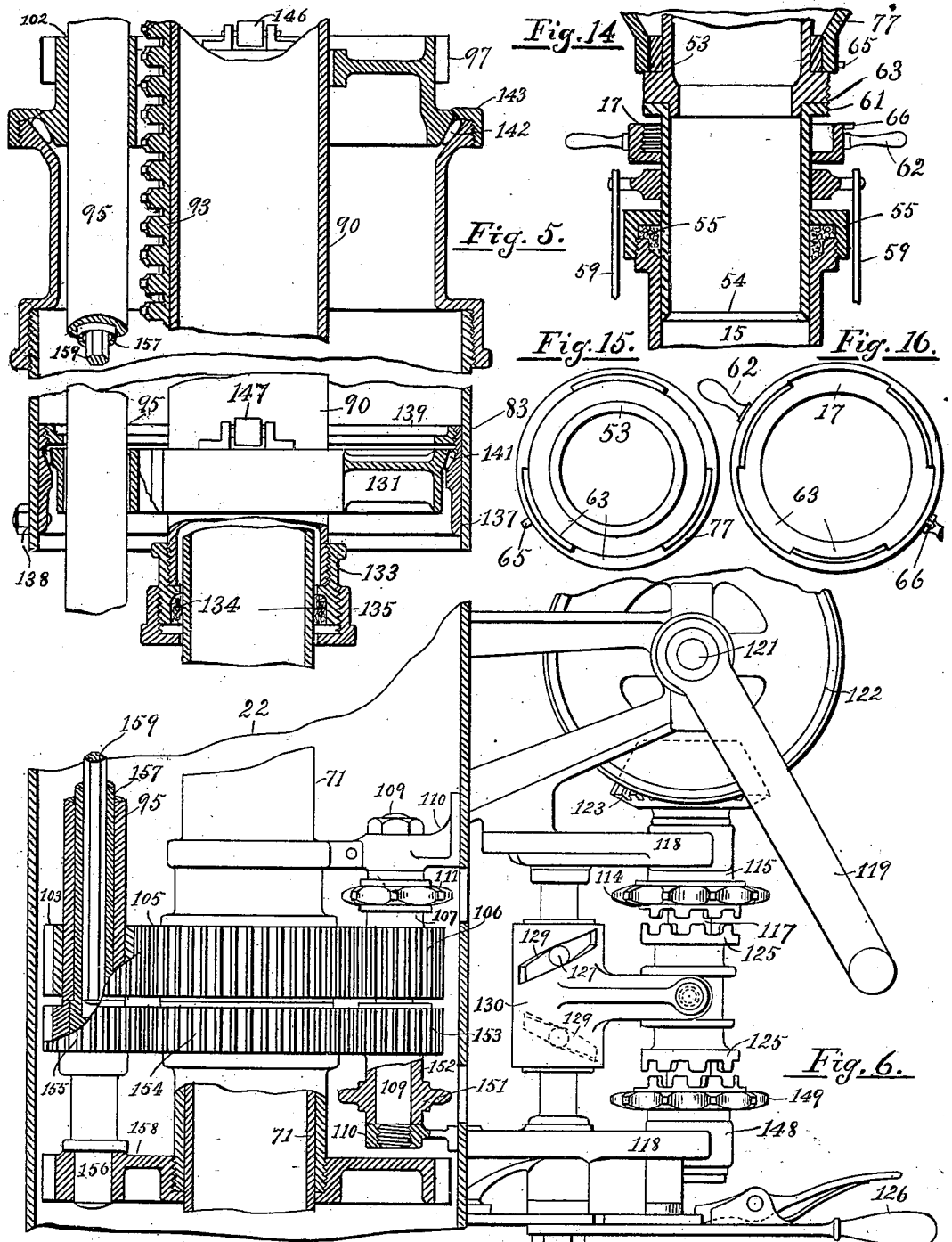
Witnesses:
K. Lockwood Nevins
Chas. Healey
Inventor:
H. H. Gorter,
By Francis M. Wright Atty

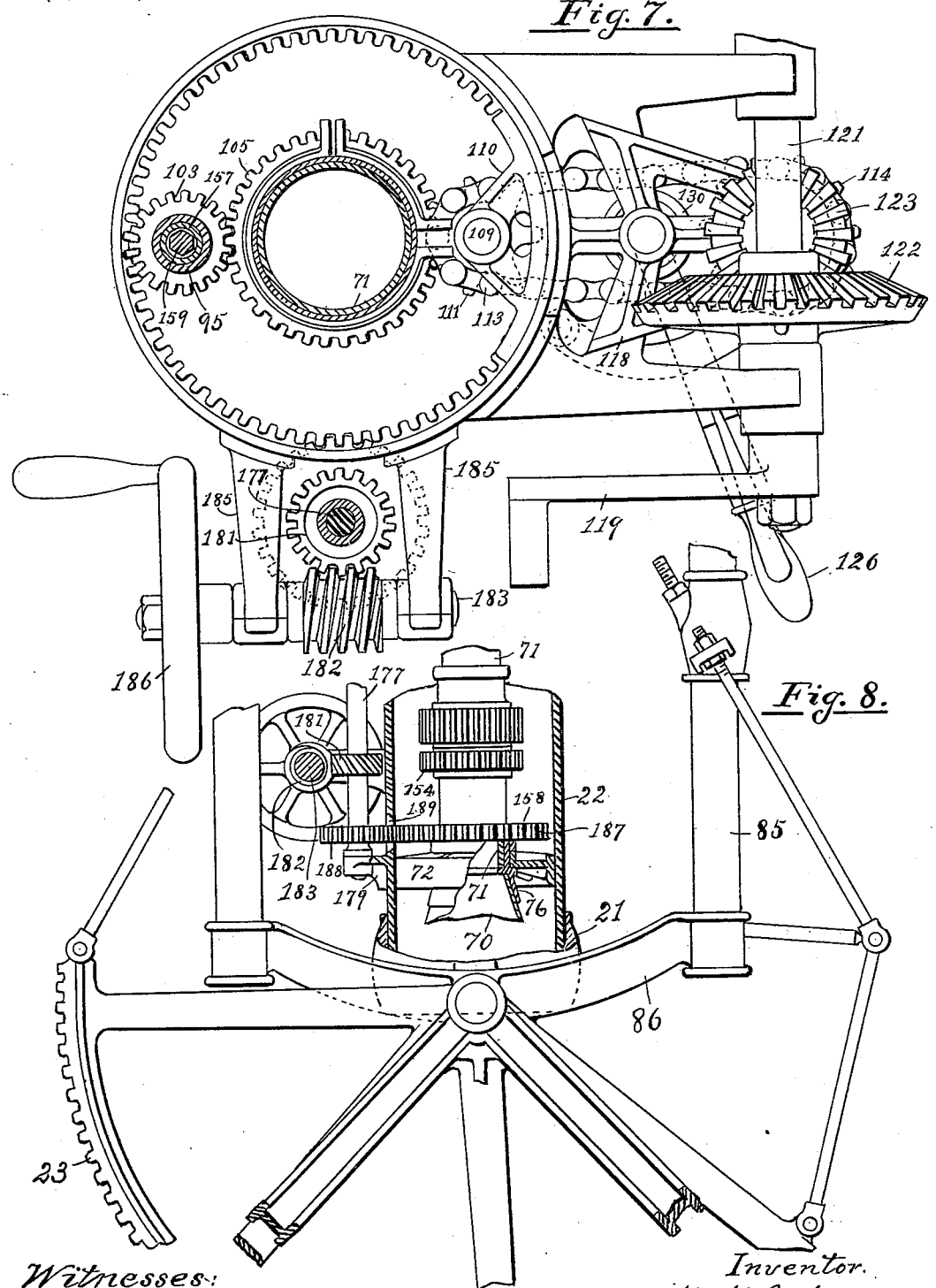

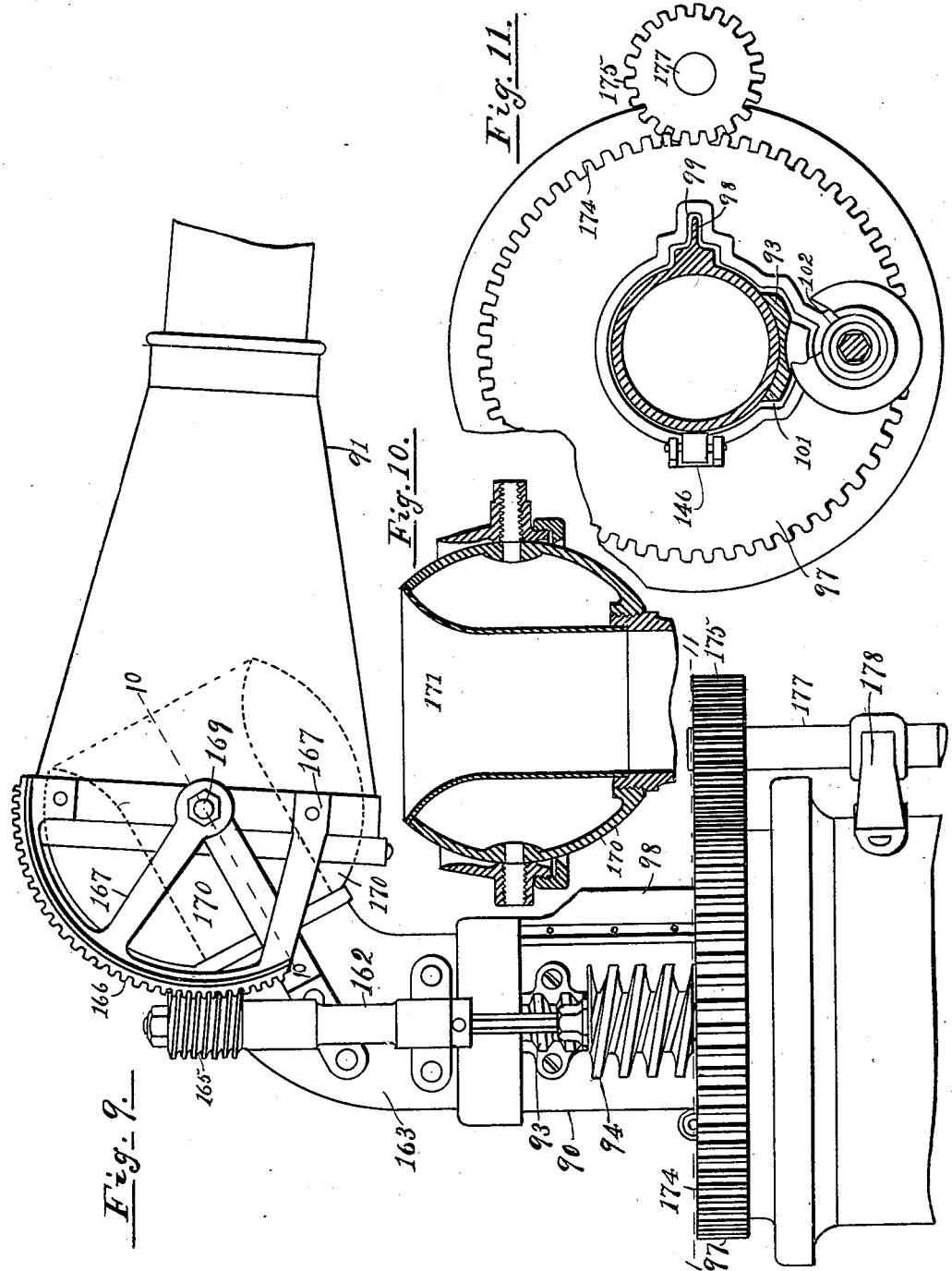

UNITED STATES PATENT OFFICE.

HENRY H. GORTER, OF SAN FRANCISCO, CALIFORNIA, ASSIGNOR TO MARY E. GORTER, OF SAME PLACE.

PORTABLE WATER-TOWER.

SPECIFICATION forming part of Letters Patent No. 645,470, dated March 13, 1900.

Application filed January 11, 1899. Serial No. 701,871. (No model.)

*To all whom it may concern:*

Be it known that I, HENRY H. GORTER, a citizen of the United States, residing at San Francisco, in the county of San Francisco and State of California, have invented certain new and useful Improvements in Portable Water-Towers, of which the following is a specification.

My invention relates to improvements in portable water-towers and comprises improved means for raising the tower and swinging it to any desired angle either when or when not discharging water, improved means for connecting the tower with the water-supply, improved means for extending the tower, enabling it to be extended or collapsed with equal facility when in operation discharging water or when the water is shut off, and improved means for directing the nozzle of the tower.

My invention also resides in the novel construction, combination, and arrangement of parts hereinafter fully specified, and particularly pointed out in the claims.

In the accompanying drawings, Figure 1 is a side elevation of the water-tower. Fig. 2 is a plan view of a portion of the truck, showing the water-pipe connections and the means for elevating and swinging the tower. In this figure the casing of the water-wheels is partly removed and the worm-segment on the right of the figure is also removed. Fig. 3 is an enlarged view of one side of the lower casing. Fig. 4 is a vertical section of the tower-support and connections. Fig. 5 is an enlarged vertical section of the top and bottom of the upper casing, the intermediate portion being removed. Fig. 6 is an enlarged vertical section of a portion of the lower casing. Fig. 7 is an enlarged horizontal section of the same. Fig. 8 is a side elevation, partly in section, at right angles to the views of Figs. 3 and 6, of the lower portion of the frame. Fig. 9 is a side elevation of the top of the hollow mast. Fig. 10 is a section on the line 10 10 of Fig. 9. Fig. 11 is a horizontal section on the line 11 11 of Fig. 9. Fig. 12 is a transverse section of the three-way valve. Fig. 13 is a longitudinal section of the same. Fig. 14 is a vertical section of the upper portion of the stand-pipe. Fig. 15 is a top plan view of the lower coupling-section, and Fig. 16 is a bottom plan view of the upper coupling-section.

Referring to the drawings, 1 represents the truck of my improved water-tower mounted on axles 2, front wheels 3, and rear wheels 5, a fifth-wheel 6 and springs 7 being interposed between the truck and the front wheels 3. Upon the middle portion of the truck is mounted a receiver 9, into which receiver conduits 10 lead from the sides of the truck, said conduits being adapted to be connected at their outer ends 11 with fire-hose 13 from the fire-engines. From said receiver a discharge-pipe 14, controlled by a cock 16, leads to the rear of the truck, being there bent upward into a stand-pipe 15 and terminating in a pipe-coupling section 17.

In suitable standards 18, erected on the frame of the truck at its rear end, are pivoted trunnions 19 at the end of arms 20, extending from a collar 21, shrunk on the tubular casing 22, said trunnions carrying the segmental worm-gears 23, driven by worms 25 on shafts 26, extending rearwardly through suitable bearings 27 on the truck, the front ends of the shafts carrying worm-gears 29. In said shafts, near the worms 25, there are interposed flexible couplings 28, which serve to avoid strains on the long shafts 26, which would otherwise be caused by slight flexure of the frame caused by the back pressure from the water thrown out of the nozzle when in action. The gears 29 are driven by worms 30 on the common shaft 31 of two water-wheels 33 34, inclosed in a casing 35, said water-wheels being arranged to drive said shaft in opposite directions, and in order to avoid longitudinal strain on the motor-shaft the worms 30 at the two ends of the shaft are made right and left handed, respectively. To operate said water-wheels, a feed-pipe 37 leads from the receiver 9 to a three-way valve 38. (Shown in detail in Figs. 12 and 13.)

The valve 38 has two discharge-openings 39 41, over which swings the gate 42, loosely mounted on a shaft 43, controlled by the handle 45, said shaft having squared sides 46, and said gate having two parallel side plates 47, fitting snugly over said squared sides, so as to be guided in a radial reciprocation from said shaft. The gate being formed in a section of a cylinder having the shaft for center will be caused to fit snugly against that one of the openings 39 41 which it closes by the pressure of the water against the concave inner face of the gate, and in addition there is provided a bow-spring 49, secured on the face of the shaft 43 between the squared sides, which spring exerts a constant pressure on said concave face to keep the gate to its work. A pipe 50 leads from the discharge-opening 39 to one of the sides of the casing 35 to operate one of the water-wheels 33 and drive the shaft 31 in one direction, and a pipe 51 leads from the discharge-opening 41 to the other side of the casing and operates the other wheel 34 to drive the shaft 31 in the opposite direction. Thus after a connection has been made with any one of the hose from the several fire-engines and pressure-water has been supplied to the receiver 9 then by operating the handle 45 the shaft 31 will be actuated by the pressure of the water from the receiver in the desired direction, and thus by means of the worms 30, gears 29, shafts 26, worms 25, and segmental gears 23 the tower proper may be raised from its normal position, as shown in Fig. 1, in which the upper end rests on a vertical frame 52 on the front end of the truck, to a substantially-vertical position for operation. When in this position, the stand-pipe 15 is connected with a depending pipe 53, carried by the tower, and brought by the above operation into a position in line with the stand-pipe 15. For this purpose the coupling is used shown in detail in Fig. 14. In the top of the stand-pipe 15 is telescoped a tube 54, packed by a washer 55 and normally drawn down by a spring 57, attached to the end of a lever 58, fulcrumed on the stand-pipe at 60, the other end of the spring being attached to the stand-pipe 15 above the lever. Thus the depending pipe 53 can be swung immediately over the top of the tube 54, and when in this position the depression of the lever 58 raises the tube 54, which is connected to said lever by a link 59, and permits the coupling to be made. Said tube 54 has an outwardly-turned flange 61, and around said flange is carried the lock-nut 62. Said lock-nut is internally threaded, and the lower end of the pipe 53 is externally threaded; but each of these threads has half of its circumference cut away in three equidistant portions, each one-sixth of the entire circumference, as shown at 63. Before the pipes 15 and 53 are coupled the lock-nut 62 is in such position that its three threaded sections are immediately below the unthreaded or cut-away sections of the sleeve 54, so that when the lock-nut 62 is moved upward one-third of a turn of the lock-nut causes its screw-threads to be in engagement along the whole of their length with the threads of the pipe 53, thus firmly locking the pipes 15 and 53 together. Two buttons 65 and 66 on the lock-nut and pipe 53 respectively serve to indicate by their engagement the proper position for connecting.

The pipe 53 terminates in its upper end in the globular chamber 67, open at the top, as shown at 69, and discharging into the converging mouth 70 of the upwardly-extending pipe 71. The lower end of said tube 71 at its junction with the mouth 70 is supported within the casing 22 by a ring 72, secured to said casing and surrounding a collar 76, encircling the lower end of the tube 71 and resting upon the upper conical end of the mouth 70.

The globular chamber 67 is mounted on trunnions 74, extending inwardly from the opposite sides of the end of the casing 22 and supported in a ring 75 in the end of the casing, and the lower end of the pipe 53 is also connected by ties or braces 77 with the lower edge of the casing 22, the ties 77 having pivotal connections 79 with said lower edge. Suitable packing 81 is provided secured by a ring 82, screwed onto the bottom of the ring 75. Thus there is provided a ball-and-socket joint between the pipe 53 and the main pipe 71 of the water-tower, said latter pipe, with the water-tower, having thus freedom of movement on the trunnions 19 within the limits permitted by the ball-and-socket coupling to enable the nozzle of the water-tower to be variously directed over the front of the building on fire, and this swinging of the tower on its trunnions can be readily operated from the water-wheels 33 34 and controlled by the three-way valve 38 as soon as a single hose has been coupled up. Thus when the tower has been erected and extended a wide range can be covered by the nozzle by swinging the tower according to the part which it is required to cover.

The frame of the tower comprises the lower casing 22, an upper casing 83, tubular rods 85, connected at their lower ends by rods 86 to the lower casing and converging slightly to the upper casing 83, oblique ties 87, and transverse ties 89, bracing said rods together. Within said upper and lower casings 83 22 are inclosed the main tube or pipe 71 and the hollow mast 90, the latter telescoping over the former and carrying the nozzle 91.

To extend the mast 90 from the main tube 71, a worm-rack 93 is secured on the outside of said mast, and with said rack 93 there meshes a worm 94 on a hollow shaft 95. 97 is a gear-ring revolubly mounted on the upper casing 83, apertured to permit the mast 90 to slide therethrough, said mast being prevented from turning in said ring by reason of a feather 98 on the mast moving in a recess 99 in the ring. Said ring is suitably recessed, as at 101, to permit the rack 93 to pass therethrough and also apertured, as at 102, to receive the hollow shaft 95. Said shaft 95 extends the length of the main pipe 71 and is driven from its lower end by means of a pinion 103, meshing with a gear-wheel 105, encircling the tube 71, said wheel 105 being driven by a pinion 106 on a sleeve 107, loosely mounted on a shaft 109, supported in brackets 110, secured within the casing 22, said sleeve 107 also carrying a sprocket-wheel 111, driven through a sprocket-chain 113 (extending through an opening in the casing 22) from a sprocket-wheel 114 on a short sleeve 115. Said sleeve 115 is loosely mounted on a shaft 117, supported in brackets 118, extending from the outside of the casing 22, and is driven by hand-power applied to a crank-handle 119 on a shaft 121, driving a bevel-wheel 122, meshing with a bevel-pinion 123 on said shaft 117. Power is communicated from the shaft 117 to the sleeve 115 by means of the clutch 125, thrown into engagement with said sleeve by means of the clutch-handle 126, the rotation of which, through the pins 127 in oblique slots 129 in a collar 130, moves said clutch 125 longitudinally along the shaft 117. It will thus be seen that by moving the clutch upward the parts are so connected that the turning of the handles 119 operates to rotate the hollow shaft 95 and extend the mast upward from the main tube. This movement of extension is limited by the abutment against a ring 131 of a sleeve 133, threaded onto the lower end of the mast 90, carrying packing 134, secured between said sleeve 133 and a nut 135, screwed thereon. The ring 131 is held between a short cylinder 137, bolted, as shown at 138, to the upper casing 83 and a ring 139, screwed into the upper end of said cylinder 137, tapering rollers 141 being interposed between the ring 131 and the cylinder 137 to permit said ring to revolve without friction within said cylinder. The ring 131, like the gear-ring 97, is apertured to permit the passage therethrough of the mast and hollow shaft 95. The gear-ring 97 is in like manner provided with tapering antifriction-rollers 142 between said gear-ring 97 and the upper end of the said upper casing 83, said gear-ring being maintained in place revolubly in said casing by means of the nut 143. On the gear-ring 97, on the side opposite to that to which the nozzle points, is mounted a roller 146, engaging the mast 90 to avoid the friction due to the back pressure from the nozzle, and on the ring 131 is mounted a similar roller 147, but on the same side as the nozzle, the pressure at this point being in the opposite direction to that at the ring 97.

By moving the clutch 125 downward the parts are so engaged that the turning of the handles 126 operates to change the inclination of the nozzle to the mast as follows: The clutch 125 being moved downward, the shaft 117 then drives, through the medium of said clutch, a short sleeve 148, loosely mounted on said shaft 117, said sleeve having formed thereon a sprocket-wheel 149, and thus, through the medium of the chain 150, passing through an aperture in the casing 22, drives a sprocket-wheel 151 on a sleeve 152, mounted on the shaft 109, said sleeve 152 having also a pinion 153, meshing with a gear-wheel 154, encircling the tube 71. Said gear-wheel on its opposite side meshes with a pinion 155, secured to a hollow shaft 157 within the shaft 95, the lower end of the shaft 157 being stepped, as shown at 156, in a ring 158, surrounding the tube 71 and resting on the collar 76. The hollow shaft 157 contains a bar 159, preferably hexagonal in section, as shown in Figs. 5, 6, and 7, and thus the rotation of the shaft 157 imparts rotation to the bar 159, while permitting longitudinal movement of said bar. The upper end of said bar is turned to rotate in a bracket 162, mounted on a curved section 163, secured on the upper end of the mast 90, and upon the extreme end of said bar is secured a worm 165, which engages a segmental worm-gear 166, secured by arms 167 on the nozzle 91. Said nozzle 91 is pivotally mounted by trunnions 169 on the globular mouth 170 of the curved section 163, so as to have a ball-and-socket movement therein, the water being directed into the nozzle 91 by means of the bell-mouth 171. Thus it will be seen that the rotation of the crank-handles 119 operates when the clutch is thrown down to raise or lower the nozzle to any desired angle with the mast within the limits of the ball-and-socket joint, and this operative connection is not affected by the telescopic movement of the mast on the main tube 71.

In order to turn the nozzle in any direction around the axis of the mast, the mast itself is turned by means of a toothed gear 174, formed on the outside of the gear-ring 97, in which said mast slides, said gear being driven by a pinion 175 on the end of a shaft 177, extending the length of the main tube 71 and mounted in bearings 178 179, secured on the upper and lower casings 83 22, respectively, said shaft being driven through a worm-gear 181 thereon by means of a worm 182 on a shaft 183, mounted transversely to the casing 22 in brackets 185 thereon and operated by a handle 186. In order to avoid strain upon the hollow shafts 95 and 157, caused by the rotation of the gear-ring 97, carrying the upper ends of said shafts, while the lower ends are supported in a ring 158, said ring is likewise caused to rotate with the gear-ring 97, and for this purpose the ring 158 is formed with a toothed gear 187, meshing with a pinion 188 on the shaft 177, said pinion extending through an aperture 189 in the casing 22 to engage said toothed gear 187. The two pinions 175 and 188 on the upper and lower ends, respectively, of the shaft 177, meshing with the rings 97 and 158 on the upper and lower ends of the mast and tube, thus maintain the mast and the shaft 95 in parallelism.

I claim—

1. In a water-tower, the combination of a pivoted frame, a main tube carried therein, a receiver, a conduit and flexible coupling for connecting the receiver with the main tube, means for supplying pressure-water to the receiver from fire-hose, a water-wheel and an operative connection therefrom to the frame to swing the same on its pivot, and a feed or branch pipe from the receiver to the water-wheel to supply pressure-water thereto to operate the same, substantially as described.

2. In a water-tower, the combination of a pivoted frame, a main tube carried therein, a receiver, a conduit and flexible coupling for connecting the receiver with the main tube, means for supplying pressure-water to the receiver from fire-hose, two oppositely-rotating water-wheels and a shaft on which both of said wheels are mounted, operative connections from the shaft to the frame to swing the same on its pivot, a feed or branch pipe from the receiver, and a reversing-valve directing the water from said pipe to one or the other of the wheels, substantially as described.

3. In a water-tower, the combination of a horizontally-pivoted tower, a shaft parallel to the pivotal axis of the tower, a motor on said shaft for driving the same, and longitudinal shafts, each operatively connecting one end of said tower-axis with the corresponding end of the motor-shaft, said longitudinal shafts being rotated in opposite directions by said motor, substantially as described.

4. In a water-tower, the combination of a horizontally-pivoted tower-frame, a main tube carried thereby, a downwardly-extending pipe movably jointed to said main tube, a stationary stand-pipe for supplying water, and a connecting-pipe extensible from one of said pipes to the other, and a coupling for the latter pipe and the connecting-pipe, substantially as described.

5. In a water-tower, the combination of a horizontally-pivoted tower-frame, a main tube carried thereby, a downwardly-extending pipe movably jointed to said main tube, a stationary stand-pipe for supplying water, a tube at the upper end of said stand-pipe, vertically movable relative thereto, and means for coupling said tube and downwardly-extending pipe, substantially as described.

6. In a water-tower, the combination of a horizontally-swinging tower-frame, a main tube carried therein, a stationary stand-pipe for supplying water, a tube vertically movable in said stand-pipe, a spring normally depressing said tube, coupling-sections carried by said tube and the swinging tower-frame, and a lever for raising said tube to bring said sections together, substantially as described.

7. In a water-tower, the combination of a horizontally-swinging casing, a main tube carried therein, a globular chamber discharging into said tube and pivoted on trunnions extending inwardly from the casing, a pipe extending downward from said chamber, and ties extending downward from the outside of the casing to the bottom of said pipe and having pivotal connections with said casing, substantially as described.

8. In a water-tower, the combination of a main tube, a hollow mast telescoping over the main tube, a nozzle mounted on the end of said mast, a rack on the outside of said mast, a shaft and means for actuating the rack extending parallel with the main tube and mast, means for rotating the mast around its axis, said means carrying also the upper end of said shaft, and means for simultaneously rotating the lower end of said shaft about the main tube, whereby said shaft is maintained parallel with the mast and tube, substantially as described.

9. In a water-tower, the combination of a main tube, a hollow mast telescoping over the main tube, means for rotating said mast on its axis, a nozzle mounted on the upper end of said mast, a rack on the outside of said mast, a shaft extending parallel with the main tube and mast, a ring revoluble around the main tube and supporting the lower end of said shaft, a ring mounted around the hollow mast and revoluble therewith supporting the upper end of said shaft, a worm on the upper end of said shaft, and means for rotating said shaft, substantially as described.

10. In a water-tower, the combination of a main tube, a hollow mast telescoping over the main tube, a rack on the outside of said mast, a nozzle pivotally mounted on the upper end of said mast, a hollow shaft extending parallel with the main tube, a worm on the upper end of said shaft engaging said rack, a second hollow shaft within the first shaft, a rod within said second shaft extensible therefrom and rotating therewith, a worm on the upper end of said rod, a worm-gear carried by the nozzle and engaged by said worm, and means for rotating the said shafts, substantially as described.

11. In a water-tower, the combination of a main tube, a hollow mast telescoping over the main tube, a rack on the outside of said mast, a nozzle pivotally mounted on the upper end of said mast, a hollow shaft extending parallel with the main tube, a worm on the upper end of said shaft engaging said rack, a second hollow shaft within the first shaft, a rod within said second shaft extensible therefrom and rotating therewith, a worm on the upper end of said rod, a worm-gear carried by the nozzle and engaged by said worm, a driving-shaft, and means for operatively connecting said driving-shaft with either of the hollow shafts, substantially as described.

12. In a water-tower, the combination of a frame, a main tube mounted thereon, a hollow mast telescopically connected with the main tube, a nozzle pivotally carried on the end of said mast, shafts for extending said mast and rocking said nozzle, a ring revolubly mounted on the upper end of the frame, and apertured to permit the passage therethrough of said mast and shafts, and means for rotating said ring, substantially as described.

13. In a water-tower, the combination of a frame, a main tube mounted therein, a hollow mast telescopically connected with the main tube, a nozzle pivotally carried on the end of said shaft, shafts for extending said mast and rocking said nozzle, a ring revolubly mounted on the upper end of the frame, and apertured to permit the passage therethrough of said mast and shafts, an antifriction-roller mounted on said ring and abutting against said mast, and means for rotating said ring, substantially as described.

14. In a water-tower, the combination of a frame, a main tube mounted therein, a hollow mast telescopically connected with the main tube, a nozzle pivotally carried on the end of said mast, shafts for extending said mast and rocking said nozzle, a ring revolubly mounted on the upper end of the frame and apertured to permit the passage therethrough of said mast and shafts, an antifriction-roller mounted on said ring and abutting against said mast, means for rotating said ring, a second ring limiting the upward movement of said mast, and an antifriction-roller on said second ring, substantially as described.

15. In a water-tower, the combination of a frame, a main tube mounted therein, a hollow mast extensible therefrom, a nozzle pivotally carried on the end of said mast, shafts for extending said mast and rocking said nozzle, a ring revolubly mounted on the upper end of the frame, the mast and shafts being rotated therewith, a ring at the lower end of the frame supporting said shafts, and means for simultaneously rotating both of said rings, substantially as described.

16. In a water-tower, the combination of a frame, a main tube mounted therein, a hollow mast extensible therefrom, a nozzle pivotally carried on the end of said mast, a hollow shaft mounted in the frame extending the length of the main tube, means for rotating the shaft from its lower end, a rod in said shaft, rotating therewith and extensible therefrom, and coöperative gears on said nozzle and the end of said rod for rocking the nozzle from the rotation of said shaft, substantially as described.

17. In a water-tower, the combination of a main tube, a hollow mast extensible therefrom, a shaft and means carried thereon for extending said mast, a curved section in the upper end of said mast having a globular end, a conical nozzle diametrically pivoted on said globular end, a segmental gear secured on the said nozzle at one end of its pivotal axis, a rotarily-driven shaft inside the first-named shaft, and a worm on the end of the inner shaft engaging said gear to rock said nozzle, substantially as described.

In witness whereof I have hereunto set my hand in the presence of two subscribing witnesses.

HENRY H. GORTER.

Witnesses:
 FRANCIS M. WRIGHT,
 CHAS. W. SMYTH.